United States Patent [19]

Kakimoto

[11] Patent Number: 4,756,517
[45] Date of Patent: Jul. 12, 1988

[54] STRUT SUSPENSION STRUCTURE OF AUTOMOBILE VEHICLE WITH VARIABLE GEOMETRY

[75] Inventor: Toshihiko Kakimoto, Hatano, Japan

[73] Assignee: Nissan Motor Company, Limited, Kanagawa, Japan

[21] Appl. No.: 772,612

[22] Filed: Sep. 4, 1985

[30] Foreign Application Priority Data

Sep. 5, 1984 [JP] Japan .................. 59-184479

[51] Int. Cl.$^4$ .............. B60G 11/14; B60G 11/62; F16F 7/00
[52] U.S. Cl. ................... 267/220; 267/35; 267/141.1; 280/668
[58] Field of Search ........... 267/20 A, 11 A, 34, 267/141.1, 8 R, 33, 152, 153, 35, 221, 186, 220, 256, 258, 217; 280/668, 689, 692, 710

[56] References Cited

U.S. PATENT DOCUMENTS

| | | | |
|---|---|---|---|
| 3,193,304 | 7/1965 | Behlke | 280/692 |
| 3,771,813 | 11/1973 | Stotz | 267/221 |
| 4,084,837 | 4/1978 | Milner | 267/221 |
| 4,105,222 | 8/1978 | Buchwald | 267/34 X |
| 4,274,655 | 6/1981 | Lederman | 267/8 R X |
| 4,377,298 | 3/1983 | Finn et al. | 267/34 X |
| 4,556,235 | 12/1985 | Giebel | 280/668 X |
| 4,568,067 | 2/1986 | Iwata | 267/33 X |

FOREIGN PATENT DOCUMENTS

| | | |
|---|---|---|
| 2645060 | 4/1978 | Fed. Rep. of Germany . |
| 2118095 | 7/1972 | France . |
| 2277690 | 2/1976 | France . |
| 58-45107 | 3/1983 | Japan . |
| 58-52007 | 4/1983 | Japan . |
| 58-167206 | 11/1983 | Japan . |
| 1005633 | 9/1965 | United Kingdom . |
| 2026131 | 1/1980 | United Kingdom .......... 267/33 |
| 2027517 | 2/1980 | United Kingdom .......... 267/8 R |

*Primary Examiner*—Andres Kashnikow
*Assistant Examiner*—Robert J. Oberleitner
*Attorney, Agent, or Firm*—Foley & Lardner, Schwartz, Jeffery, Schwaab, Mack, Blumenthal & Evans

[57] ABSTRACT

A strut suspension for an automotive vehicle has its upper end connected to a suspension support which allows the upper end of the suspension strut to shift in a direction oblique to the longitudinal axis of the strut in response to vertical movement of a vehicle wheel. Shifting of the upper end of the strut is controlled by means of a link member rotatably connected to the upper end of the strut. The link member is rotatably connected to the suspension support. This structure ensures negative camber during roll-steer, anti-dive characteristics, and weak under-steer, and suppresses harshness by providing a suspension geometry which optimizes suspension characteristics depending upon the vehicle driving conditions.

20 Claims, 6 Drawing Sheets

STRUT SUSPENSION STRUCTURE OF AUTOMOBILE VEHICLE WITH VARIABLE GEOMETRY

BACKGROUND OF THE INVENTION

The present invention relates generally to a strut suspension structure for an automotive vehicle, the geometry of which adjusts to vehicle driving conditions so as to prevent suspension camber from changing to positive camber, to lower the suspension harshness level and to suppress vehicular pitch during acceleration and deceleration. More specifically, the invention relates to a mounting structure of a suspension strut assembly which allows the upper end of the suspension strut assembly to move in a direction perpendicular to the longitudinal axis of the strut assembly.

FIGS. 9 and 10 show a typical suspension geometry used in strut-type vehicular suspensions. A steering knuckle 107 supporting a road wheel 109 is supported in turn by a transverse link 103. The inner end of the transverse link 103 is connected to the vehicle body through an elastic bushing 101. On the other hand, the outer end of the transverse link 103 is connected to the aforementioned steering knuckle 107 via a lower ball joint 105. The steering knuckle 107 is also connected to the lower end of a suspension strut 111. The upper end 113 of the suspension strut 111 is connected to a vehicle body (not shown) via an elastic or resilient suspension support (not shown).

In such strut-type suspensions, in order to avoid significant change of wheel alignment during compliance steering or bump steering the suspension is aligned so that the longitudinal axis of the strut assembly 111 is approximately aligned with the deformation axis of the suspension support in order to constrain displacement of the upper end of the strut assembly to its longitudinal axis. This geometry effectively minimizes compliance or bump steering in response to minimal changes in wheel alignment.

However, this conventional geometry induces significant camber change toward positive camber in response to roll steering. Centrifugal forces on the vehicle during cornering tend to displace the outside wheels upwards. In such cases, the transverse link 103 pivots upwards as shown in phantom line in FIG. 9. This pivotal movement of the transverse link 103 causes displacement of the lower ball joint 105 not only upward but also transversely inward. Rolling of the vehicle body furthers this transverse displacement of the lower ball joint. As a result, the camber angle $\theta$ changes to positive-camber whereby the cornering force may be reduced far enough to allow transverse sliding of the vehicular wheels.

On the other hand, during bump steering, the wheel axis Wc tends to be displaced frontward, which increases the harshness level. The harshness level can be lowered by reducing the caster angle, whereby the center of inertia Pc of the suspension shifts inwards and so increases from $r_1$ to $r_2$ the lever arm working against a counter force R which is the vector sum of a vertical counter force $R_y$ and a load-shifting counter force $R_z$. Explansion of the lever arm from $r_1$ to $r_2$ tends to exacerbate pitch during acceleration and deceleration, such as during braking. Thus, it has been considered impossible to achieve both of suppression of harshness and anti-dive characteristics.

It has been known that increased caster trail results in better centering characteristics. Greater caster trail ensures weak under-steer for good driving stability. However, this, in turn, tends to increase the required steering force.

SUMMARY OF THE INVENTION

The fundamental idea of the present invention is to provide a strut suspension geometry adjustable according to vehicle driving conditions to optimize suspension characteristics.

Therefore, it is an object of the present invention to provide a strut suspension with variable geometry designed to avoid positive camber during rollor compliance-steering, to suppress harshness over bumps and to minimize pitch during acceleration and deceleration of the vehicle.

Another and more specific object of the invention is to provide a strut suspension with a strut assembly which has an upper end capable being displaced advantageously according to vehicle driving conditions.

In order to accomplish the aforementioned and other objects of the invention, a suspension strut has an upper end connected to a suspension support such that the upper end of the suspension strut may shift in a direction inclined from the longitudinal axis of the strut in response to essentially vertical motion of an associated vehicle wheel.

In the preferred structure, transverse positioning of the upper end of the strut is controlled by means of a link member pivotably connected to the upper end of the strut. The link member is, in turn, pivotably connected to the suspension support.

According to one aspect of the invention, a strut suspension for an automotive vehicle comprises a strut assembly having a lower end associated with a vehicle wheel for displacement with the latter and an upper end, a suspension support provided between the upper end of the strut assembly and a vehicle body for displaceably connecting the upper end of the strut assembly to the vehicle body, and means responsive to displacement of the upper end of the strut assembly with respect to the suspension support generally along the longitudinal axis of the strut assembly for shifting the upper end of the strut assembly with respect to the suspension support in a direction oblique to the longitudinal axis of the strut assembly.

The means for shifting the upper end of the strut assembly is responsive to displacement of the strut assembly upwards to shift the upper end of the strut assembly in a direction preventing a change toward positive-camber. The means may shift the upper end of the strut assembly in the direction of increased caster trail. Another alternative is for the means to shift the upper end of the strut assembly in the direction of decreased longitudinal lever arm in response to displacement of the strut assembly upwards to limit dive.

According to another aspect of the invention, a method for changing the geometry of a strut suspension so as to optimize suspension characteristics in accordance with vehicle driving conditions comprises the steps of:

suspending a vehicular wheel from a vehicle body by way of a strut assembly in a predetermined initial geometry for initial alignment of the vehicular wheel, in which the lower end of the strut assembly is connected to the vehicular wheel and the upper end thereof is connected to the vehicle body via a suspension support; and causing transverse shift of the upper end of the strut assembly in response to vertical movement of the vehicular wheel relative to the vehicle body, thereby changing the initial geometry for re-alignment of the vehicle wheel according to vehicle driving conditions.

BRIEF DESCRIPTION OF THE DRAWINGS

The present invention will be understood from the detailed description given herebelow and from the accompanying drawings of the preferred embodiments of the invention, which, however, should not be taken to limit the invention to the specific embodiments, but are for explanation and understanding only.

In the drawings.

DESCRIPTION OF THE PREFERRED EMBODIMENT

Figure 1:
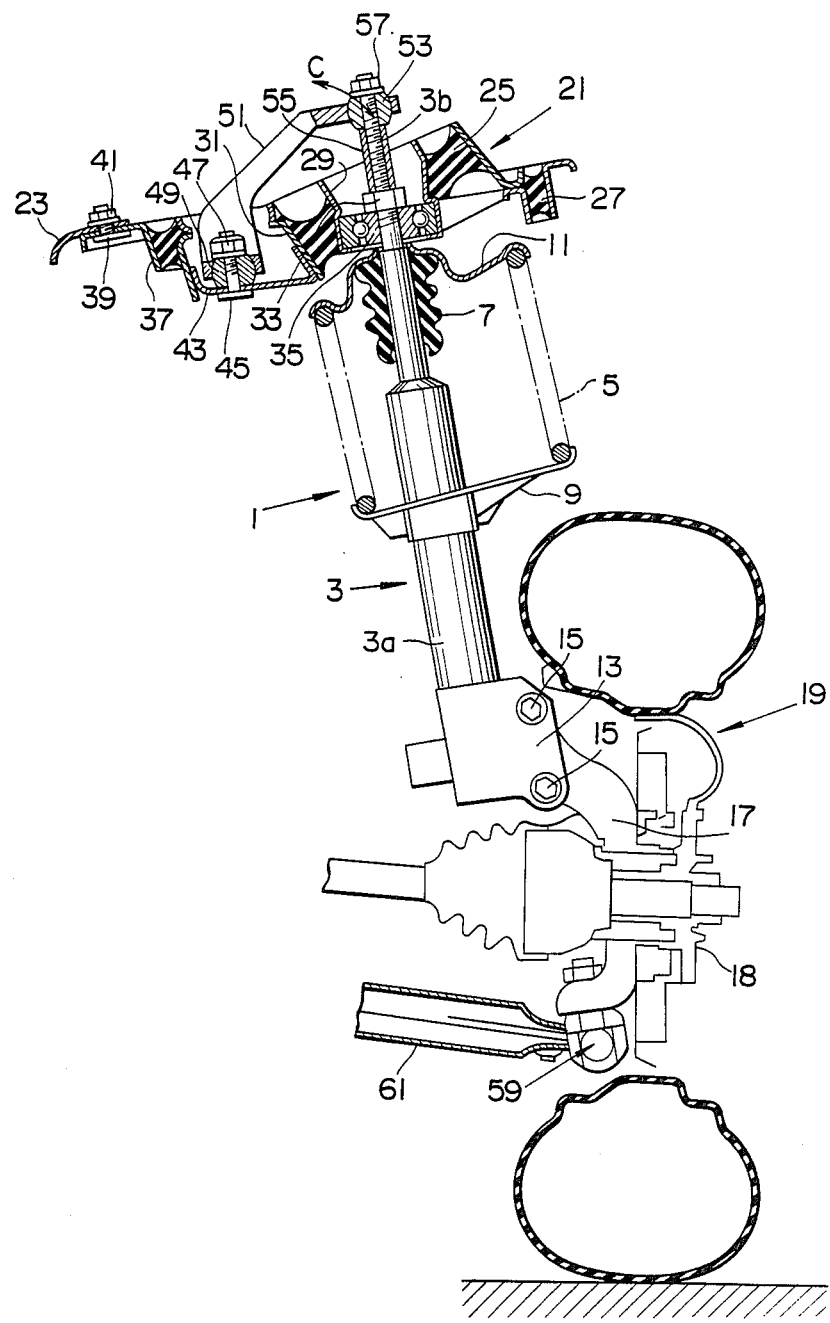
FIG. 1 is a view in partial section of the first embodiment of a strut suspension for an automotive vehicle according to the present invention.
Figure 2:
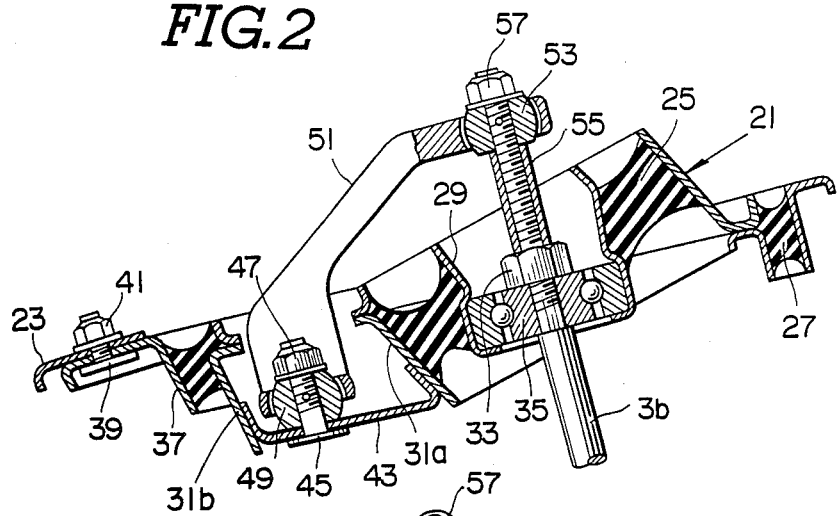
FIG. 2 is an enlarged section through the major part of the rut suspension of FIG. 1.
Figure 3:
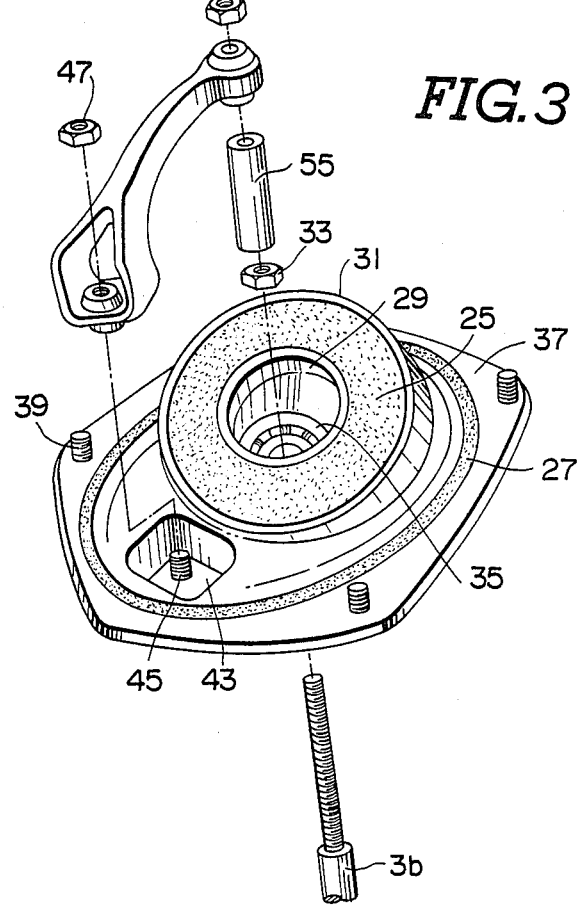
FIG. 3 is an exploded perspective view of the mounting structure for the upper end of the strut assembly in the preferred embodiment of the strut suspension.

Referring now to the drawings, particularly to FIGS. 1 to 3, the first embodiment of a strut suspension for an automotive vehicle, according to the invention, includes a strut assembly 1 having a shock absorber 3, a suspension coil spring 5 and an insulator rubber 7. The suspension coil spring 5 is disposed between a lower spring seat 9 fixed to the outer periphery of a strut 3a which encloses the shock absorber 3 and an upper spring seat 11 fixedly mounted on a piston rod 3b of the shock absorber 3.

A bracket 13 is fixed to the lower end of the strut 3a. A steering knuckle 17 is fixed to the bracket 13 by means of bolts 15. A wheel hub 18 is mounted on the steering knuckle and, in turn, rotatably mounts a road wheel 19. Therefore, the road wheel 19 is connected to the lower end of the strut assembly 1 via the steering knuckle 17.

The upper end of the strut assembly 1 is connected to a vehicle body panel 23 via a suspension support 21. As best shown in FIGS. 2 and 3, the suspension support 21 comprises a first inner annular bushing 25 and a second outer annular bushing 27. The first inner bushing 25 is disposed between a center bracket 29 and an inner bracket 31. The center bracket 29 supports the outer race of a bearing 35 which is fixed to the piston rod 3b by means of a fixing nut 33. The center bracket 29 and the inner bracket 31 have axes oblique to the longitudinal axis of the piston rod and inclined inwardly and rearwardly. By arranging the center bracket 29 and the inner bracket 31 oblique to the longitudinal axis of the piston rod, the deformation axis of the first inner bushing 25 lies oblique to the longitudinal axis of the piston rod and inclined inwardly and rearwardly. The second outer bracket 27 is disposed between the inner bracket 31 and an outer bracket 37. The outer bracket 37 is fixed to the vehicle body panel 23 by means of bolts 39 and nuts 41.

At the inward side of the strut assembly 1, the inner bracket 31 is separated into an inner component 31a and an outer component 31b. A link support bracket 43 is located inside the strut assembly between the inner and outer components 31a and 31b of the inner bracket 31. The transverse edges of the link support bracket 43 are fixedly connected to the inner and outer components 31a and 31b of the inner bracket 31. A gimbal 49 is fixed to the link support bracket 43 by means of a bolt 45 and a nut 47. An assist link 51 rotatably engages the gimbal 49 at its inner end. The outer end of the assist link 51 rotatably engages another gimbal 53 which is fixed to the top of the piston rod 3b by means of a fastening nut 57. The position of the gimbal 53 along the longitudinal axis of the piston rod 3b is determined by a spacer collar 55 screwed onto the piston rod 3b below the gimbal 53. Therefore, the gimbal 53 is held in place by means of the fastening nut 57 and the spacer collar 55.

In the shown embodiment, the suspension support 21 including the inner bushing 25, and the assist link 43 constitute means for shifting or displacing the upper end of the strut assembly in a direction oblique to the longitudinal axis of the piston rod 3b.

The steering knuckle connected to the lower end of the strut assembly 1 is also connected to a transverse link 61 via a lower ball joint 59.

The working geometries of the first embodiment set forth above will be described herebelow. FIG. 1 shows the suspension under normal driving conditions in which camber angle of the road wheel 19 is approximately zero. At this condition, the treads of the tire are in constant contact with the road surface as the vehicle moves straight ahead.

As vehicle passes through a corner, centrifugal force is exerted on the vehicle body, causing the vehicle body to roll toward the outside, causing the road wheel 19 on the outside of the curve to shift upward with respect to the vehicle body. An upward force is thus exerted on the shock absorber 3 via the steering knuckle 17 and the bracket 13. This causes compression of the shock absorber 3 thus transmitting a reacting force to the piston rod 3b. At the same time, the suspension coil spring 5 is compressed between the upper and lower spring seats 11 and 9. The reacting force of the shock absorber 3 and the spring force of the suspension coil spring 5 are cooperatively exerted as an upward force along the longitudinal axis of the piston rod 3b. In this case, since the deformation axis of the suspension support is inclined inward and rearward, the upper end of the piston rod shifts along the arrow C in FIG. 1.

Figure 4:
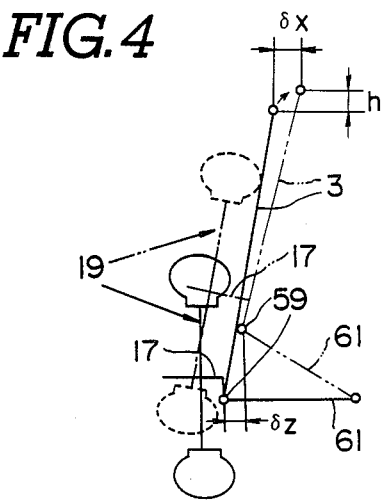
FIG. 4 is a diagram of the suspension as viewed from the front and showing camber change during bounding of the vehicle wheel.

This displacement is diagrammed in FIG. 4. As seen from FIG. 4, the top of the piston rod 3b shifts upwards by the amount h in FIG. 4, inward by the amount $\delta_x$ in FIG. 4 and rearward by the amount $\delta_y$ in FIG. 5. The inward shift $\delta_x$ is greater than the inward shift $\delta_z$ of the lower ball joint 59. As a result, the strut assembly 1 pivots slightly to the inside about the lower ball joint 59. This causes pivotal inclination of the vertical axis of the road wheel 19 slightly inward. This changes the road wheel camber in the negative-camber direction so as to keep the camber angle of the road wheel zero or slightly negative even as the vehicle body rolls. This ensures a cornering force of the suspension sufficient for stably executing the corner.

Figure 5:
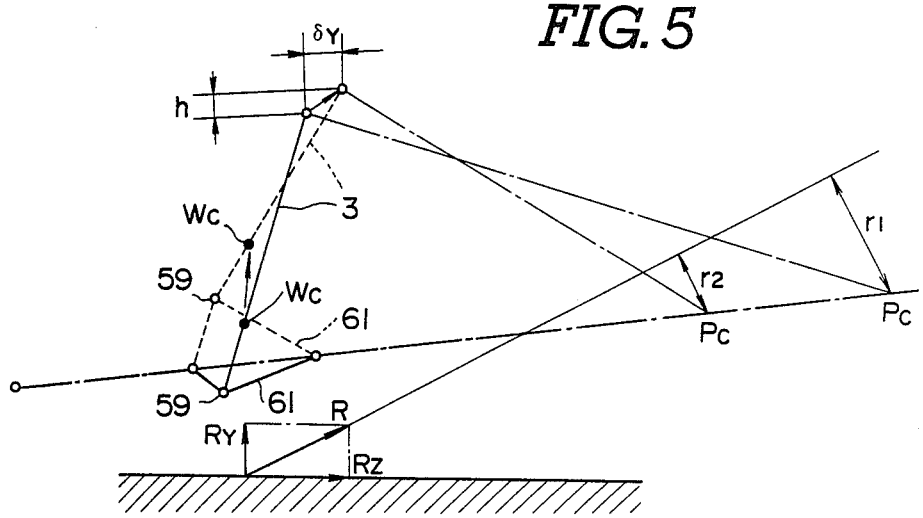
FIG. 5 is a diagram of the suspension as viewed from the side showing change of caster trail for anti-dive control.

At the same time, since the top of the piston rod 3b is shifted rearward in response to suspension roll-steer, the caster trail increases as shown in FIG. 5. This enhances the under-steer characteristics for better cornering stability. On the other hand, when vehicle returns to the normal, straight ahead driving, the caster trail is reduced to its original value. Therefore, change of the caster trail during cornering does not affect steering characteristics under normal conditions.

On the other hand, when the vehicle passes over a bump. the wheel center Wc shifts slightly rearward in response to bounding motion of the vehicle wheel relative to the vehicle body, as shown in FIG. 5. The rearward shift of the wheel center Wc lowers the harshness level to an acceptable level.

During vehicle deceleration such as during braking, the top of the strut assembly 1 shifts rearward the amount $\delta_y$ due to vertical displacement of the road wheel relative to the vehicle body. This shifts the center of inertia Pc of the suspension relative to the braking counter force $R_y$ and the load-shifting counter force $R_z$ forward to the position labelled Pc'. This shortens the moment arm from $r_1$ to $r_2$. Shortening of the moment arm improves anti-dive characteristics.

Furthermore, when the vehicle is relatively heavily loaded, for example, with a large number of passengers, so that the vehicle body rides relatively low, the top of the piston rod shifts inward and rearward as set forth above. This changes the camber in the negative direction so as to hold the camber angle at zero or slightly negative. This provides better driving stability and increased tire traction to ensure good cornering characteristics. Furthermore, by providing zero camber or slightly negative camber, differential wear on the edges of the tire can be prevented.

It should be noted that, when relative vertical displacement between the vehicle body and the road wheel occurs due to static load, such as during loading and unloading, the reacting force or damping force of the shock absorber disappears as the fluid pressure returns to equilibrium. When loaded, the shock absorber may become more rigid than normal. On the other hand, when vehicle bottoms out so that the strut 3a abuts the insulator rubber 7, the reaction force of the insulator rubber may serve as an input force to the suspension support 21.

In a modification, the upper spring seat 11 is attached directly to the vehicle body panel 23 instead of to the piston rod. This avoids transmission of the input force from the road wheel 19 solely through the piston rod 3b. The same effects during cornering as described above would be observed.

It should be further noted that the above geometry change occurs only when a significant relative vertical displacement between the vehicle body and the road wheel occurs. This means that if the magnitude of the vertical displacement is not so significant, the geometry change set forth above will not occur. This prevents frequent change of the suspension geometry which would tend to degrade drivability of the vehicle.

Figure 6:
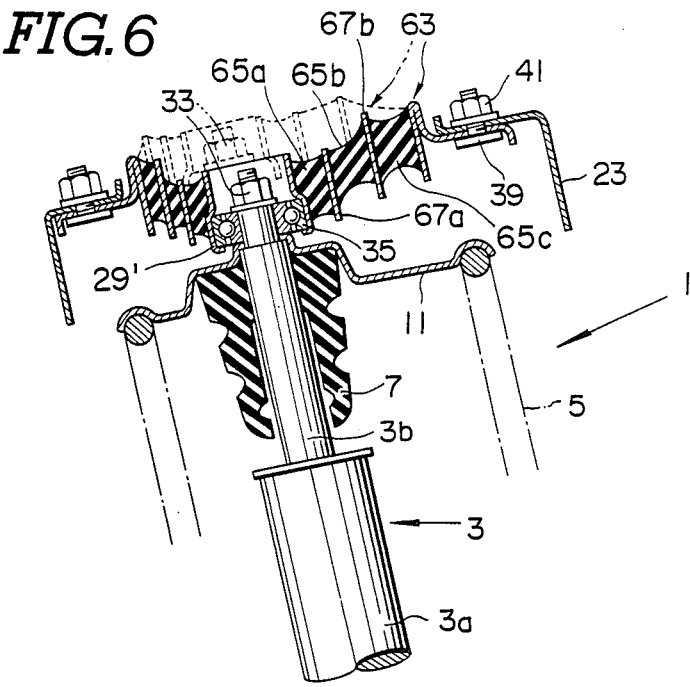
FIG. 6 is a section through the second embodiment of a strut suspension according to the invention.

FIG. 6 shows the second embodiment of the mounting structure for the strut assembly embodying the present invention. In this second embodiment, the suspension geometry changes in response to the bounding motion of the road wheel relative to the vehicle body due to the compliance of the bushings forming the suspension support. The deformation axis of the bushing assembly serving as a suspension support 63 is designed to achieve the desired geometry, as shown in FIG. 6. The suspension support 63 comprises three annular bushings 65a, 65b and 65c. The inner peripheral surface of the innermost bushing 65a is attached to the inner bracket 29'. The outer periphery of the outermost bushing 65c is attached to the outer bracket 31. Annular plates 67a and 67b between the bushings 65a and 65b and between bushings 65b and 65c, are inserted so as to separate the bushings into three sections.

As will be apparent from FIG. 6, the bushings 65a, 65b and 65c all have greater radii outward and forward than inward and rearward in order to allow a greater deformation stroke in response to input forces due to bounding motion of the road wheel relative to the vehicle body. In such cases, the top of the piston rod shifts inwards and rearwards. Therefore, the suspension geometry changes as described with respect to the first embodiment. During this inward shifting of the top of the strut assembly 1, the annular plates 67a and 67b serve to smooth deformation of the bushing assemblies for causing the shift.

Figure 7:
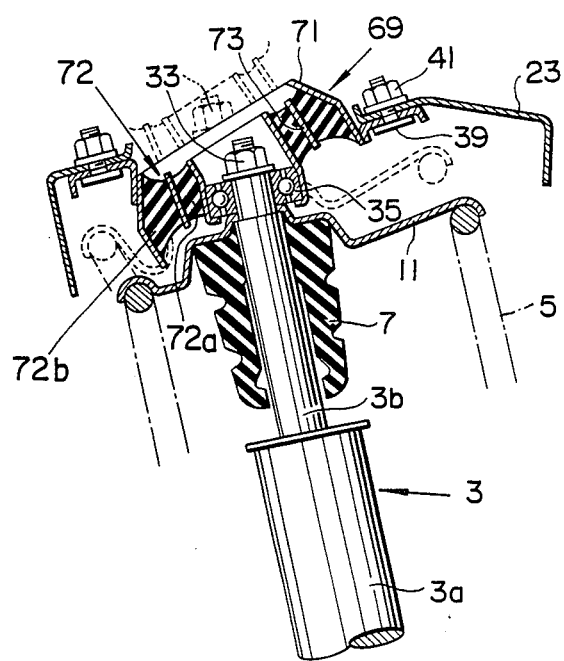
FIG. 7 is a section through the third embodiment of a strut suspension according to the invention.

FIG. 7 shows the third embodiment of the mounting structure of the variable-geometry strut assembly. This embodiment simply employs a bushing assembly as a suspension support 69 having a deformation axis inclided inward and rearward with respect to the longitudinal, essentially vertical axis of the strut assembly so as to achieve an inward and rearward shifting of the top of the strut assembly 1 during roll steer, compliance steer, bump steer, acceleration and deceleration of the vehicle, and so forth. In order to incline the deformation axis inward and rearward, the inner and outer brackets 71a and 71b are both inclined inward and rearward, remaining generally parallel to each other. An annular bushing 72 is separated into inner and outer sections 72a and 72b by an annular ring 73 inserted therebetwen.

This arrangement is based on generally the same idea as set out with respect to the first embodiment. However, by separating the bushing 72 into inner and outer sections 72a and 72b by means of the annular ring 73, the total working area of the bushing can be greater than in the first embodiment. This increases the deformation stroke in response to roll steer, compliance steer, bump steer, nose dive and so forth. the vehicle driving condition.

Figure 8:
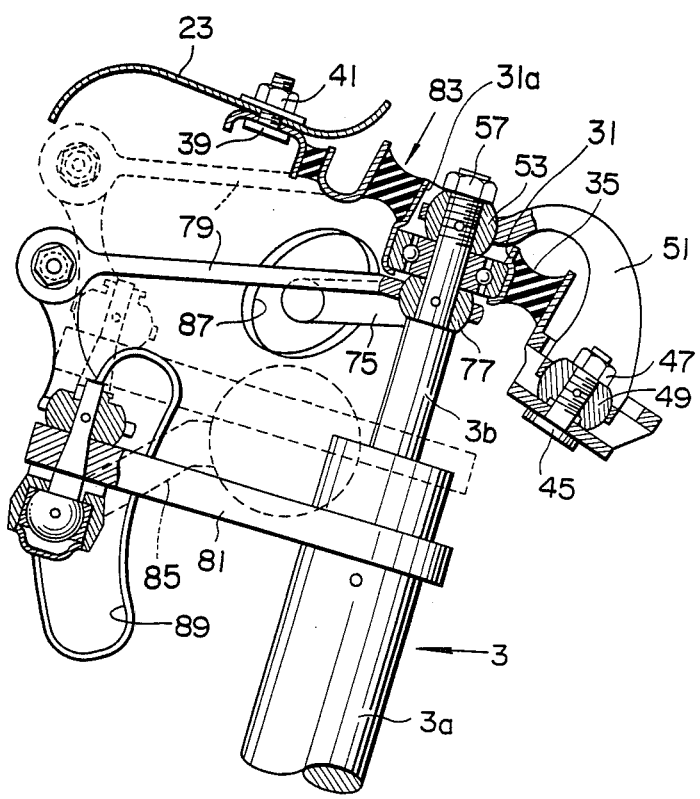
FIG. 8 is a section through the fourth embodiment of a strut suspension according to the invention.
Figure 9:
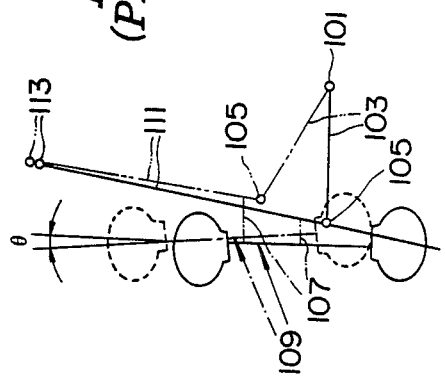
FIGS. 9 and 10, set forth above, diagramatically show the conventional strut suspension geometry.
Figure 10:
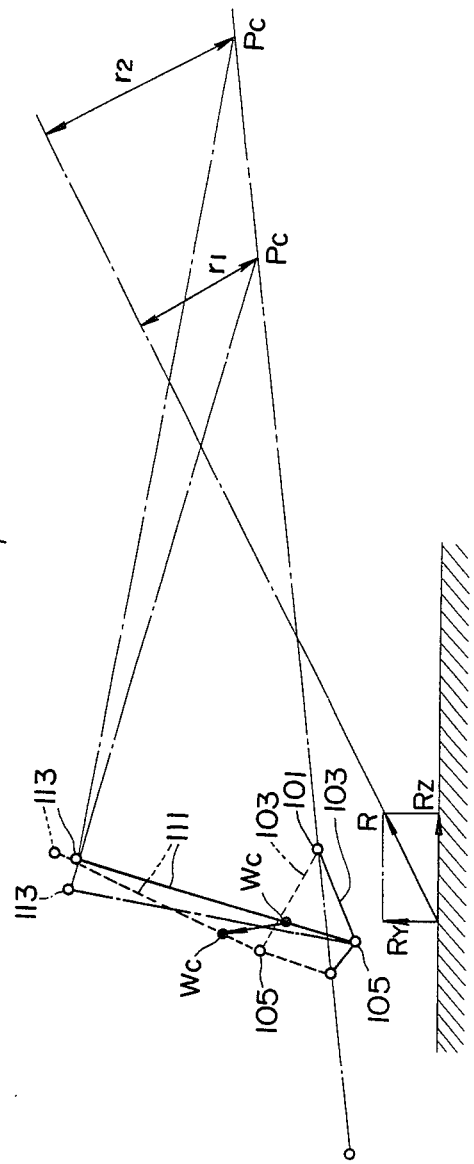

FIG. 8 shows the fourth embodiment of the mounting structure of the suspension strut according to the invention. In this embodiment, a roll stabilizer 75 is added to the suspension system and connected to the strut assembly 1. The end of the stabilizer 75 is connected to the piston rod 3b through a gimbal 77. The stabilizer 75 has an integral arm 79. The arm 79 is connected to an arm 81 which is secured to the outer periphery of the strut 3.

On the other hand, as in the first embodiment, the upper end of the strut assembly 1 is connected to a vehicle body panel 23 via a suspension support 83. The suspension support 83 comprises a first inner annular bushing 25 and a second outer annular bushing 27. The first inner bushing 25 is disposed between a center bracket 29 and an inner bracket 31., The center bracket 29 supports the outer race of a bearing 35 which is fixed to the piston rod 3b above the gimbal 77 for the stabilizer 75. The deformation axis of the first inner bushing 25 lies oblique to the longitudinal axis of the piston rod, inclined inward and rearward. The second outer bracket 27 is disposed between the inner bracket 31 and an outer bracket 37. The outer bracket 37 is fixed to the vehicle body panel 23.

At the inward side of the strut assembly 1, the inner bracket 31 is separated into inner and outer components as in the first embodiment, although the outer component has beem omitted from FIG. 8. A link support bracket 43 is located to the inside of the strut assembly and disposed between the inner and outer components 31a of the inner bracket 31. The edges of the link support bracket 43 are fixedly connected to the inner and outer components of the inner bracket 31. A gimbal 49 is fixed to the link support bracket 43 by means of a bolt 45 and a nut 47. An assist link 51 rotatably engages the gimbal 49 at its inner end. The outer end of the assist link 51 rotatably engages another gimbal 53 which is fixed to the top of the piston rod 3b by means of a fastening nut 57.

In the shown embodiment, the suspension support 21 including the inner bushing 25 and the assist link 43 constitute means for shifting or displacing the upper end of the strut assembly in a direction oblique to the longitudinal axis of the piston rod 3b.

The steering knuckle connected to the lower end of the strut assembly 1 is also connected to a transverse link 61 via a lower ball joint 59.

The geometry of this fourth embodiment of strut suspension changes similarly in response to vertical wheel displacement as the first embodiment. It should be noted that in this fourth embodiment, the upward force on the piston rod during roll steer is transmitted through the stabilizer 75 instead of via the strut assembly. However, on the other hand, relative displacements between the vehicle body and the road wheel due to static loads, such as loading of passengers, will not cause the suspension geometry to change.

In FIG. 8, the reference numeral 87 denotes a hole through the vehicle body tire well for the transversely extending stabilizer 75. Similarly, the reference numeral 89 denotes a hole for a side rod 85.

Therefore, the present invention fulfills all of the objects and advantages sought therefor.

While specific embodiments have been disclosed hereabove in order to describe the present invention in detail and facilitate better understanding of the invention, the invention should not be limited to the shown embodiments. For example, although in the shown embodiments, the top of the strut assembly shifts both inward and rearward, advantageous geometry changes can be achieved with shifts in either of the inward and rearward directions. Furthermore, if necessary, shifts in a direction or directions opposite to that of the foregoing embodiments, i.e. forward and/or outward may be executed in response to roll steer, compliance steer, bump steer, nose dive and so forth.

What is claimed is:

1. A strut suspension for an automotive vehicle comprising:
   a strut assembly having a lower end connected to a vehicle wheel for displacement with the latter and an upper end;
   a suspension support disposed between said upper end of said strut assembly and a vehicle body for displaceably connecting the upper end of the strut assembly to the vehicle body; and
   means, responsive to displacement of the upper end of the strut assembly with respect to the vehicle body essentially parallel to the longitudinal axis of the strut assembly, for shifting said upper end of said strut assembly with respect to said vehicle body in a direction oblique to the longitudinal axis of said strut assembly.

2. The strut suspension as set forth in claim 1, wherein said means for shifting the upper end of said strut assembly is responsive to relative vertical displacement of said vehicle wheel and said vehicle body to shift the upper end of said strut assembly in a direction preventing camber change toward positive-camber.

3. The strut suspension as set forth in claim 1, wherein said means for shifting the upper end of said strut assembly is responsive to relative vertical displacement of said vehicle wheel and said vehicle body to shift the upper end of said strut assembly in a direction of increased caster trail.

4. The strut suspension as set forth in claim 1, wherein said means for shifting the upper end of said strut assembly is responsive to relative vertical displacement of said vehicle wheel and said vehicle body to shift the upper end of said strut assembly in a direction of decrease moment arm of the suspension system.

5. The strut suspension as set forth in claim 1, wherein said means for shifting of the upper end of strut assembly comprises a bushing built into said suspension support and deformable along an axis allowing said strut assembly to shift in a direction oblique to said longitudinal axis of said strut assembly.

6. The strut suspension as set forth in claim 5, wherein said means further comprises a pivotal link member pivotably connecting said upper end of said strut assembly to said vehicle body, which pivotal link member cooperates with said bushing to allow oblique shifting of said upper end of said strut assembly.

7. The strut assembly as set forth in claim 6, wherein said pivotal link has one end connected to a first bearing allowing said link to rotate about said upper end of said strut assembly and the other end connected to said vehicle body through a second bearing allowing pivotal movement of said pivotal link about its pivot axis.

8. The strut assembly as set forth in claim 7, wherein said strut assembly comprises a shock absorber with a piston thrustingly moveable within a shock absorber cylinder and a piston rod extending upwardly from the top of the shock absorber cylinder, the upper end of said piston rod forming said upper end of strut assembly, and said first bearing comprises a gimbal secured to said upper end of said piston rod.

9. The strut assembly as set forth in claim 8, wherein said second bearing comprises a gimbal secured to said vehicle body.

10. The strut assembly as set forth in claim 5, wherein the deformation axis of said bushing lies oblique to the longitudinal axis of said strut assembly.

11. The strut assembly as set forth in claim 10, wherein the deformation axis of said bushing is offset inward from the longitudinal axis of said strut assembly.

12. The strut assembly as set forth in claim 10, wherein provided with the deformation axis of said bushing is offset rearward from the longitudinal axis of said strut assembly.

13. The strut assembly as set forth in claim 12, said bushing is mounted on said vehicle body by means of a mounting bracket which has an axis which is oblique to the longitudinal axis of the piston rod and inclined at least one of an inward and rearward direction for defininq said deformation axis of said bushing.

14. The strut assembly as set forth in claim 12, wherein said bushing has a vehicular at least one of a front and an outer section having thickness greater than at least one of a vehicular rear and an inner section to have greater deformation ability for defining said deformation axis inclined at least one of a rearward and an inward direction from the longitudinal axis of said strut assembly.

15. The strut assembly as set forth in claim 12, wherein said bushing has a one section having thickness greater than another section to have greater deformation ability for defining said oblique deformation axis.

16. The strut assembly as set forth in claim 15, wherein said bushing is separated into a plurality of sections by means of at least one annular partitioning ring.

17. A method for adjusting the geometry of a strut suspension so as to optimize suspension characteristics in accordance with vehicle driving condition, comprising the steps of:

suspending a vehicular wheel from a vehicle body via a strut assembly in a predetermined initial geometry for initial alignment of said vehicular wheel, in which the lower end of said strut assembly is connected to said vehicular wheel and the upper end thereof is connected to the vehicle body via a suspension support; and shifting said upper end of said strut assembly at least in response to vertical movement of said vehicular wheel relative to said vehicle body so as to change the suspension geometry from said initial geometry for re-alignment of said vehicle wheel according to vehicle driving conditions.

18. The method as set forth in claim 17, wherein said upper end of said strut assembly is shifted in the direction of positive camber change.

19. The method as set forth in claim 17, wherein said upper end of said strut assembly is shifted in the direction of increased caster trail.

20. The method as set forth in claim 17, wherein said upper end of said strut, assembly is shifted in the direction of decreased moment arm of the suspension system.

* * * * *